US012274329B1

(12) United States Patent
Song et al.

(10) Patent No.: US 12,274,329 B1
(45) Date of Patent: Apr. 15, 2025

(54) PERSONALIZED INSOLES FOR SUPPORTING A FOOT IN AN ALIGNED LOAD BEARING POSITION

(71) Applicant: Amazon Technologies, Inc., Seattle, WA (US)

(72) Inventors: Jinsup Song, Bala Cynwyd, PA (US); Eric Steven Holan, Seattle, WA (US); Asfand Yar Khan, Redmond, WA (US); Tushar Mahale, Seattle, WA (US); Dominique Lavoie, Concord, CA (US)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 17/951,368

(22) Filed: Sep. 23, 2022

(51) Int. Cl.
*A43D 1/02* (2006.01)
*G06T 7/73* (2017.01)
*G06T 17/00* (2006.01)
*G06T 19/20* (2011.01)

(52) U.S. Cl.
CPC ............ *A43D 1/025* (2013.01); *G06T 7/73* (2017.01); *G06T 17/00* (2013.01); *G06T 19/20* (2013.01); *G06T 2207/30196* (2013.01); *G06T 2219/2004* (2013.01)

(58) Field of Classification Search
CPC ........... A43D 1/025; G06T 7/73; G06T 17/00; G06T 2207/30196; G06T 2219/2004; G06T 19/20
See application file for complete search history.

(56) References Cited

U.S. PATENT DOCUMENTS

| 2006/0283243 | A1* | 12/2006 | Peterson | A61B 5/1036 |
| | | | | 73/172 |
| 2017/0255185 | A1* | 9/2017 | Hinshaw | A43D 1/025 |
| 2019/0175070 | A1* | 6/2019 | Decker | A61B 5/1074 |
| 2019/0209093 | A1* | 7/2019 | Watts | A61B 5/004 |
| 2021/0042458 | A1* | 2/2021 | Dayal | G06F 30/23 |
| 2021/0315323 | A1* | 10/2021 | Hakkala | A61B 5/0064 |

* cited by examiner

*Primary Examiner* — Sing-Wai Wu
*Assistant Examiner* — Khoa Vu
(74) *Attorney, Agent, or Firm* — Knobbe, Martens, Olson & Bear, LLP

(57) ABSTRACT

Disclosed are various embodiments for creating personalized insoles designed to provide physical comfort to the individual wearing shoes containing the personalized insoles. Three-dimensional (3D) foot scans are performed on the individual's feet to better understand the contours and geometry of each foot of the individual. The foot scans can be of each foot of the individual in varying positions (e.g., resting position with toes engaged with scanner top, toes-raised position with toes lifted from scanner top, metatarsal doming position, neutral calcaneal stance position, etc.). The 3D foot scans are used to generate personalized insole data that can be transmitted to a manufacturing device for manufacturing a personalized insole that is accurately designed to conform with the individual's foot and provide support in aligned load bearing positions.

20 Claims, 10 Drawing Sheets

Left Foot in Resting Position with Scanner Surface

Left Foot in Raised-Toes Position on Scanner Surface

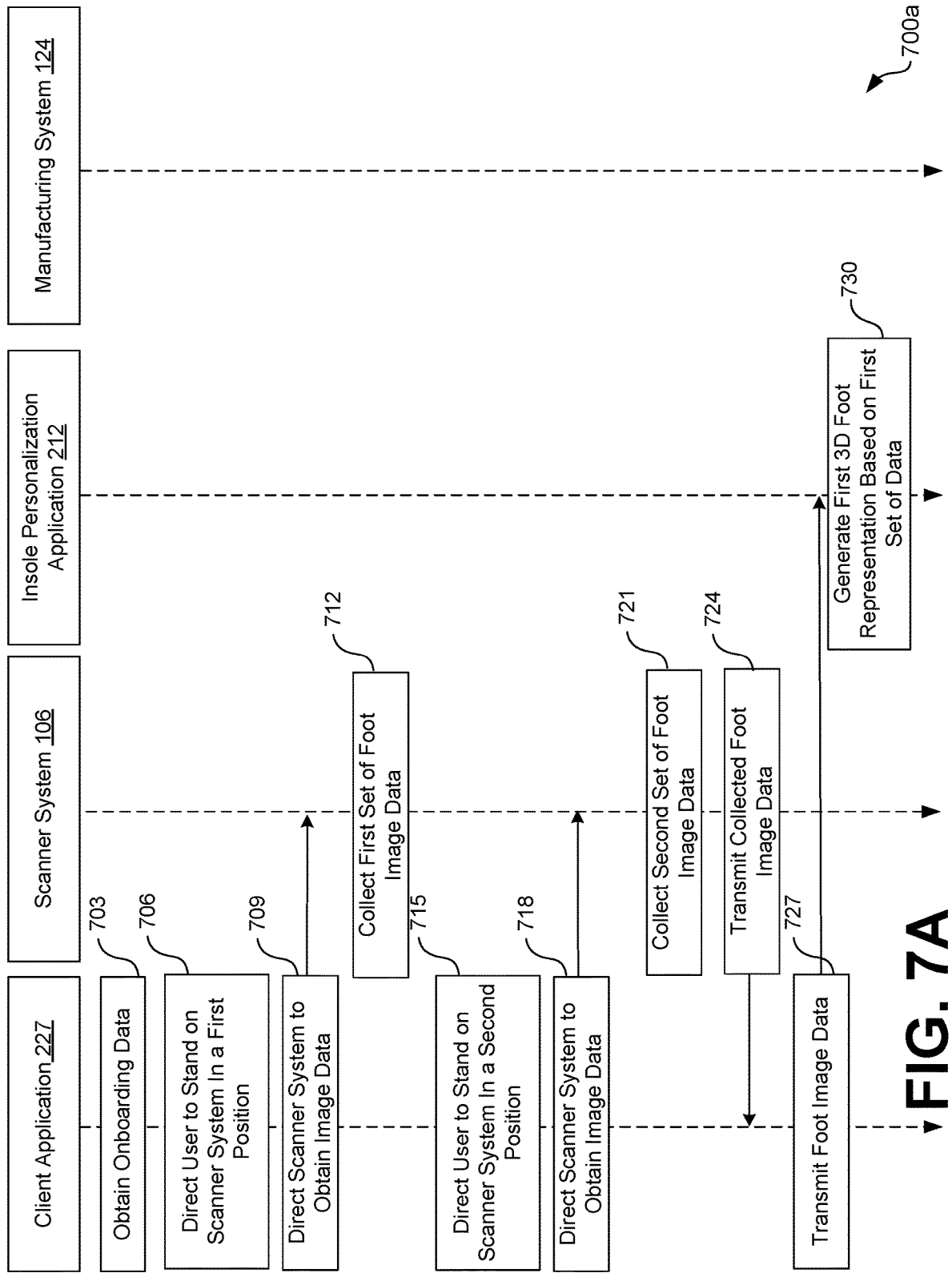

PERSONALIZED INSOLES FOR SUPPORTING A FOOT IN AN ALIGNED LOAD BEARING POSITION

BACKGROUND

Foot pain or discomfort can be caused from a variety of factors, including standing on one's feet for an extended period of time. For example, associates working in an environment (e.g., fulfillment center) that causes them to be on their feet on hard surfaces (e.g., concrete) for prolonged amounts of time may experience foot pain or discomfort. Individuals can place generic inserts or insoles in their shoes that may be designed to relieve pressure or discomfort due to standing all day. However, these generic insoles may not properly fit in the individuals shoe requiring the individual to trim away portions of the insole to make the insole fit into the individual's shoe. In addition, the generic insoles may have features for relieving the pressure or discomfort that fail to align with the contours of the individual's foot and/or their overall foot geometry.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3A illustrates an example drawing of the back of an individual's leg in a first standing position where the individual's toes are flat and engaged with a surface. FIG. 3B illustrates an example view of the back of the individual's leg in a second standing position where the individual's toes are lifted and raised away from the surface. FIG. 3C illustrates an example drawing of the hindfoot alignment differences between the leg of FIG. 3A and the leg of 3B in view of the different standing positions.

FIG. 4A illustrates a top view of the scanner system and FIG. 4B illustrates a cross section of a side view of the scanner system.

FIG. 5A illustrates a back view of the foot positioned on the scanner top plate. FIG. 5B illustrates a bottom view of the foot positioned on the scanner top plate. FIG. 5C illustrates a side view of the foot positioned on the scanner top plate.

FIGS. 7A-7B correspond to a sequence diagram illustrating one example of functionality of the various components of in the networked environment of FIG. 2 according to various embodiments of the present disclosure.

DETAILED DESCRIPTION

The present disclosure relates to manufacturing scalable and personalized insoles that are designed to provide physical comfort to the individual wearing shoes containing the personalized insoles. An insole corresponds to the part of the shoe that is located at the bottom of the inside of a shoe and engages with the sole of the foot of the individual wearing the shoe. According to various embodiments of the present disclosure, three-dimensional (3D) foot scans are performed on the individual's feet to better understand the contours and geometry of each foot of the individual. In various examples, the foot scans can correspond to scans of a foot with the foot being in one or more different positions (e.g., resting position, toes-raised position, metatarsal doming position, neutral calcaneal stance position (NCSP) etc.). According to various examples, the 3D foot scans can be analyzed and used to generate an insole that provides a more supportive fit that is personalized for the individual by conforming to the contours of the individual's foot and/or their overall foot geometry in order to minimize foot pain and/or discomfort for the individual when the individual is standing for an extended period of time.

Figure 1:
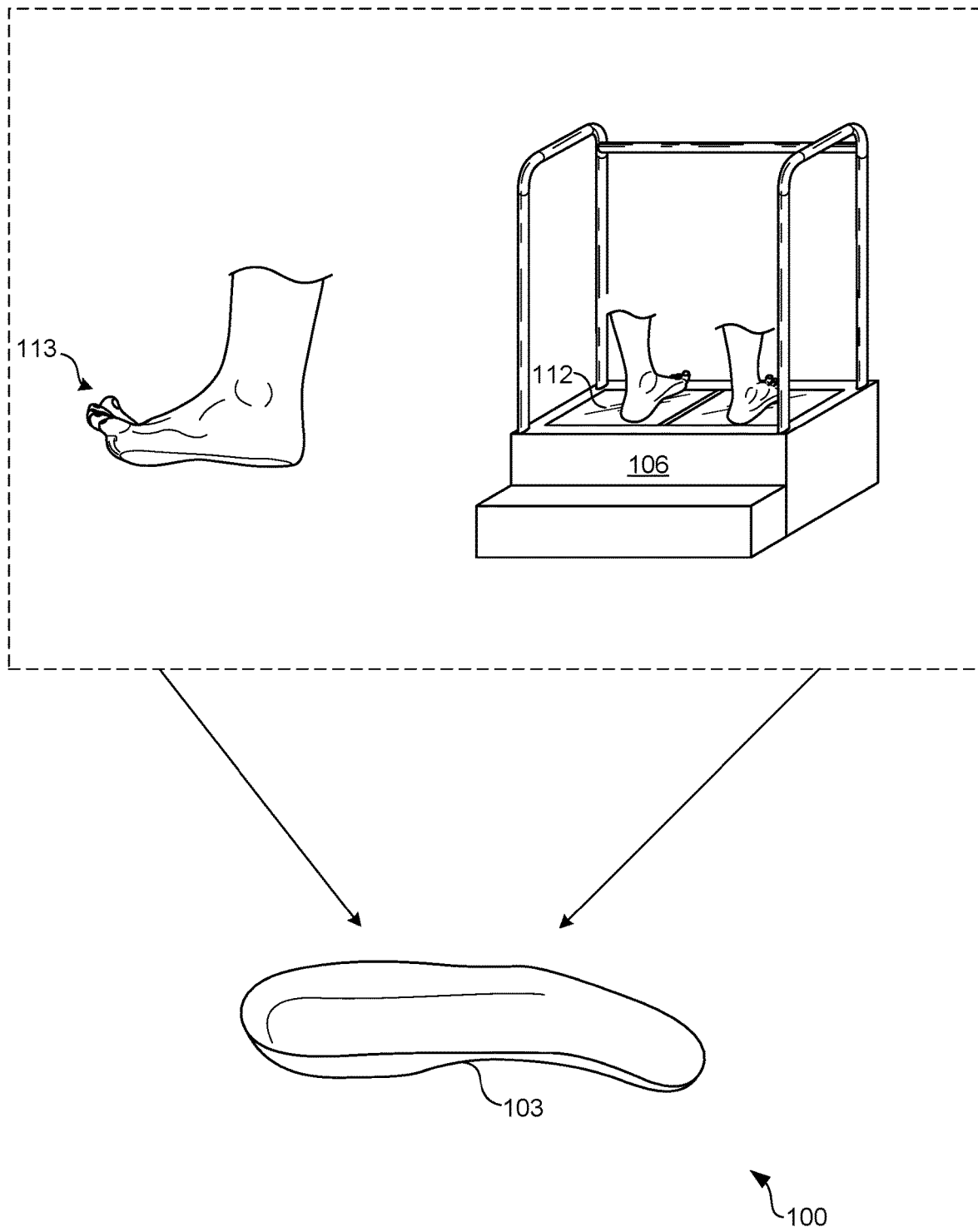
FIG. 1 is a drawing of an example scenario associated with obtaining a foot scan from a scanner system to generate a personalized insole according to various embodiments of the present disclosure.

Turning now to FIG. 1, shown is an example scenario 100 associated with the creation of personalized insoles 103 according to various embodiments. In particular, shown is a perspective view of an example scanner system 106 that is configured to perform a foot scan of an individual's feet. In various examples, an individual can stand or otherwise position his or her feet on a scanner top plate 112 of the scanner system 106 to allow a foot scan to be performed on his or her bare feet. The individual can position his or her feet on the scanner top plate 112 in one or more positions or orientations to allow the scanner system 106 to obtain one or more foot scans that can be used to identify the contours of the individual's foot as well as the overall geometry of the individual's foot. In particular, in various examples, the positions or orientations of the foot can correspond to a resting calcaneal stance position (RCSP), a neutral calcaneal *stans* position (NCSP), a simulated NCSP (e.g., toes-raised, metatarsal doming, etc), and/or other position. A NCSP corresponds to a position that promotes ideal alignment of the foot and ankle. For example, the individual can position his or her feet in a resting position where the heel and toes of the foot are relaxed and engaged with the top surface of the scanner top plate 112. This position can correspond to a resting calcaneal stance position. In another example, the individual can position his or her feet in a toes-raised position 113 where the toes of the foot are raised and extend away from the top surface of the scanner top plate 112 while the heel remains flat and engaged with the top surface of the scanner top plate 112. In another example, the individual can position his or her feet in a metatarsal doming position where one or more of the toes remain engaged with the top surface of the scanner top plate 112 but are brought in closer to the heel of the foot to shorten the length of the foot and create a dome in the arch of the foot. The toes-raised position 113 and the metatarsal doming position both correspond to positions that simulate a neutral calcaneal stance position.

Once the individual's feet are properly positioned on the scanner top plate 112 of the scanner system 106, the scanner system 106 can perform a foot scan by capturing images of the individual's feet from various angles. In various examples, one or more foot scans can be performed on the feet for one or more foot positions (e.g., resting, toes-raised, metatarsal doming, etc.). The foot image data 115 (FIG. 2) from the foot scans can be analyzed to generate personalized insole data 121 (FIG. 2) for a personalized insole 103 that can be placed in the individual's shoe and conforms to the contours and overall foot geometry of the individual's foot as well as support the foot when the user is in an aligned load bearing position.

In various examples, the foot image data 115 can be used to generate a 3D representation of the user's foot and identify characteristics of the user's foot including, for example, a foot length, a foot width, toe sizes, metatarsal head location, arch height, arch length, and/or other features. In various examples, the foot image data 115 can comprise different sets of data corresponding to different foot scans of a foot in different foot positions. For example, a first set of foot image data 115 can comprise foot image data of one or more foot scans of a foot in a resting position (e.g., RCSP) and a second set of foot image data 115 can comprise foot image data of one or more foot scans of the same foot in a neutral calcaneal stance position or a simulated NCSP (e.g., toes-raised position 113, metatarsal doming position).

In various examples, the different sets of foot image data can be used to generate respective 3D foot representations of the foot in the corresponding foot positions. The 3D foot representations corresponding to different foot positions can be compared to calculate or otherwise determine adjustment parameters associated with the contours and overall foot geometry of the individual's foot. For example, a 3D foot representation of a foot in a resting position can be compared with a 3D foot representation of a foot in a toes-raised position 113 to identify areas of the 3D foot representation of the foot in the resting position that may need to be modified (e.g., arch height, toe placement, metatarsal head location, etc.).

In various examples, the analysis of the different sets of foot data and identified adjustment parameters can be used to generate the personalized insole data 121. In various examples, the personalized insole data 121 comprises an image file format (e.g., computer-aided design (CAD) file) that can be read by a manufacturing system 124 to create a three-dimensional object that corresponds to the personalized insole 103 or a component of the personalized insole 103. In other examples, the personalized insole data can be converted into an image file format that can be read by the manufacturing system 124.

It should be appreciated that the personalized insole 103 or one or more components of the personalized insole 103 can be manufactured using a manufacturing system 124 and/or process that employs one or more manufacturing techniques such as, for example, 3D printing, injection molding, casting, compression molding, and/or other techniques. In various examples, the personalized insole 103 can be manufactured as a single component. In other examples, the personalized insole 103 comprises multiple components where one or more components can be manufactured using differing manufacturing processes. In addition, in some examples, the manufacturing process is fully automated. In other examples, the manufacturing process can include one or more manual steps.

In various examples, the personalized insole 103 or personalize insole component comprises a ¾ length insole that extends from a heel of a foot to the surface of the ball of the foot (e.g., metatarsal head). In various examples, the foot scans can be used to estimate an accurate location of the metatarsal head of the foot to help ensure that the leading edge of the ¾ length shoe insole is placed correctly against the individual's foot in order to provide comfort and minimize any foot pain or discomfort. In various examples, a foam layer 127 (FIG. 6) extending the length of the foot (e.g., heel to the end of the big toe) is placed on top of the personalized insole 103. It should be noted that the personalized insole 103 or personalized insole components are not limited to ¾ length and can be greater than or less than ¾ length. For example, the personalized insole 103 can extend the length of the individual's foot.

In various examples, the individual can perform one or more onboarding tasks via interactions with a client device 130. The onboarding tasks can be designed to instruct the individual how to stand or otherwise position his or her feet on the scanner system 106. In addition, the onboarding tasks can be used to collect onboarding data corresponding to the individual and/or the shoe that the personalized insole is being created for. For example, the onboarding data can include user characteristics 136 (FIG. 2) and/or shoe properties 139 (FIG. 2) corresponding to the individual and/or the shoe that the personalized insole is being created for. The user characteristics 136 can include, for example, a user name, a user height, a user weight, a user foot size, a user foot length, a user foot width, a role of the user in an organization, an estimated amount of time the user is on his or her feet during a given day, one or more individual defined conditions of the foot (e.g., foot pain, plantar fasciitis, Morton's toe heel pain, neuroma, high arches, etc.), and/or other data. The shoe properties 139 can include a shoe type, a shoe brand, a shoe size, an estimated wear time of the shoe by the individual, and/or other information. In various examples, the onboarding data can be used by the scanner system 106 to obtain an accurate foot scan.

According to various examples, the scanner system 106 is designed to capture an optical scan of a foot from multiple angles using an array of image sensors 133 (FIG. 2) that are positioned about the scanner top plate 112 (e.g., above, below, to the side, etc.). In contrast to traditional pressure scanning techniques, the optical scanning methods of the present disclosure are able to accurately obtain contour and foot geometry data. For example, in optical scanning, the arch of a foot is not in contact with the scanner top plate 112 and it is a specific height from the surface of the scanner top plate 112. While this specific height can be captured in the optical scan, it cannot be accurately obtained via a pressure scan. In addition, the use of an array of image sensors 133 instead of a traditional single traversing scanner provides a scalable scanning solution that limits the overall scanning time of the foot and/or insoles, thereby reducing the amount of time it takes to create and generate the personalized insoles 103 for the user.

In various examples, a first subset of sensors 133 are positioned below the scanner top plate 112 and a second subset of sensors 133 are positioned above the scanner top plate 112. For example, the second subset of sensors 133 can be positioned above the scanner top plate 112 to capture images associated with the back of the individual's leg. The images captured from back of the individual's leg can be used to determine an alignment of the individual's ankle relative to the heel of the foot when the individual is standing in one or more different positions. In the following discussion, a general description of the system and its components is provided, followed by a discussion of the operation of the same.

Figure 2:
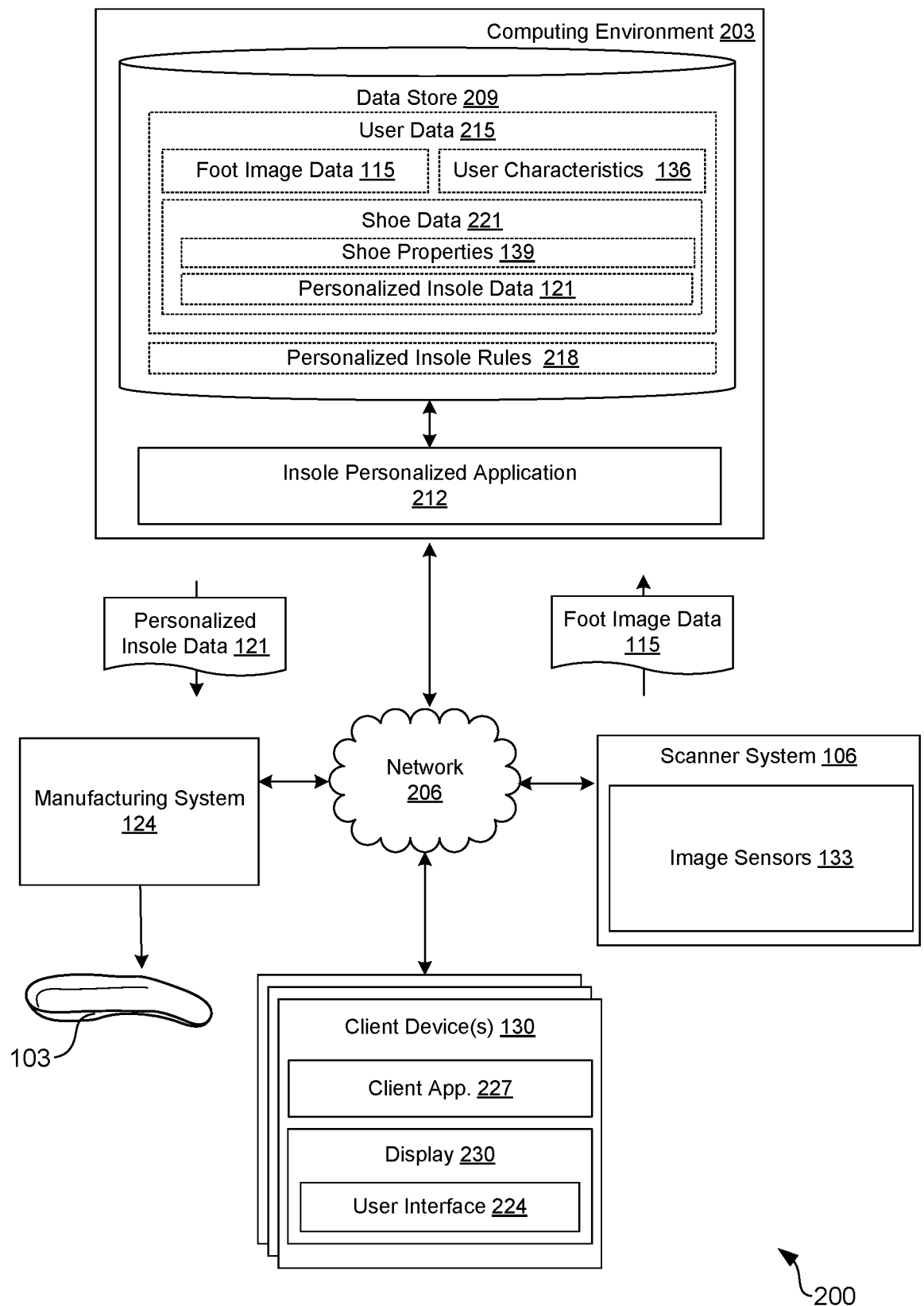
FIG. 2 is a schematic block diagram of a networked environment according to various embodiments of the present disclosure.

With reference to FIG. 2, shown is a networked environment 200 according to various embodiments. The networked environment 200 includes a computing environment 203, a client device 130, a scanner system 106, and a manufacturing system 124, which are in data communication with each other via a network 206. The network 206 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 209 that is accessible to the computing environment 203. The data store 209 may be representative of a plurality of data stores 209 as can be appreciated. The data stored in the data store 209, for example, is associated with the operation of the various applications and/or functional entities described below.

The components executed on the computing environment 203, for example, include an insole personalization application 212, and other applications, services, processes, systems, engines, or functionality not discussed in detail herein. The insole personalization application 212 is executed to generate personalized insole data 121 based at least in part on an analysis of foot image data 115 associated with one or more foot positions (e.g., resting, toes-raised, metatarsal doming, NSCP, etc.). In various examples, the foot image data 115 corresponds to various images of an individual's foot that are captured via an array of optical image sensors 133 placed below or about a scanner top plate 112 on which the individual is standing or has otherwise positioned his or her feet during the foot scan. In various examples, the foot image data 115 can comprise different sets of data corresponding to different foot scans of a foot in different foot positions. For example, a first set of foot image data 115 can comprise foot image data of one or more foot scans of a foot in a resting position and a second set of foot image data 115 can comprise foot image data of one or more foot scans of the same foot in a toes-raised position 113, metatarsal doming position, NSCP, or other position.

The insole personalization application 212 can combine the captured images included in a first set of foot image data 115 to generate a 3D representation of the individual's foot in the first position. Similarly, the insole personalization application 212 can combine the captured images included in a second set of foot image data 115 associated with a second position to generate a 3D representation of the individual's foot in the second position. In various examples, the 3D representation comprises point cloud data associated with the image data captured from the array of optical image sensors 133. In various examples, the insole personalization application 212 can analyze the foot image data 115 and/or the 3D representation(s) of the foot to identify contours of the foot and the overall foot geometry. For example, the insole personalization application 212 can analyze the foot image data 115 to identify characteristics of the user's foot including, for example, a foot length, a foot width, toe sizes, metatarsal head location, arch height, arch length, and/or other features.

In various examples, the insole personalization application 212 determines a baseline associated with the user's foot according to a 3D foot representation generated using the set of foot image data 115 corresponding to the resting foot position. The resting foot position corresponds to a position where the heel and toes of the foot are relaxed and engaged with the top surface of the scanner top plate 112. In various examples, the baseline corresponds to a negative of the bottom of the foot obtained from a 3D representation of the foot in the resting position.

In various examples, the insole personalization application 212 can compare the baseline associated with the user's foot with a 3D foot representation of the foot in second position (e.g., a toes-raised position 113, a metatarsal doming position, NCSP, or other simulated NSCP) to identify areas of the baseline that require adjustment of the baseline to conform with the foot in an aligned load bearing position. It should be noted that the toes-raised position 113, the metatarsal doming position, NCSP, or other simulated NSCP cause the ankle to roll outward slightly, thereby aligning the ankle joint over the heel to mimic the body's natural aligned load-bearing position. In various examples, the identified areas or adjustment parameters can be used to modify the baseline, the 3D representation of the user's foot in the resting position, and/or the personalized insole data 121 generated based at least in part on the 3D representation of the foot in a position that differs from the resting position (e.g., toes-raised, metatarsal doming, NCSP, etc.).

In various examples, the insole personalization application 212 can generate personalized insole data 121 corresponding to a 3D representation of a personalized insole 103 based at least in part on the 3D foot representations of the foot in different positions, the baseline, the identified areas of adjustment, the identified adjustment parameters, the user characteristics 136, the shoe properties 139, and/or other data. In various examples, the personalized insole data 121 defines the shape, size, and contours the personalized insole 103 that is determined according to the 3D foot representations. In some examples, the personalized insole data 121 represents a negative of the bottom of the 3D foot representation of the foot in the resting position that is modified according to the identified attributes identified from one or more comparison(s) of the different sets of foot image data from different positions, the user characteristics 136, the shoe properties 139 and/or other data.

In various examples, the insole personalization application 212 can input features associated with the 3D foot representations of different positions, the identified attributes, the user characteristics 136, the shoe properties 139, and/or other data into a machine learning model that is trained to output the personalized insole data 121 based at least in in part on the various inputs. In various examples, the model can be trained to identify various attributes associated with the foot and modify the 3D foot representation to account for the various attributes such that personalized insole 103 generated using the personalized insole data 121 can be inserted into the individual's shoe in order to minimize foot pain or discomfort while the individual is wearing the shoe. Various approaches for generating personalized insole data 121 using insole scan data of insoles of shoes worn by the user are described in U.S. patent application Ser. No. 17/951,363 entitled "PERSONALIZED SHOE INSOLES," filed Sep. 23, 2022, which is incorporated by reference herein in its entirety.

In various examples, the personalized insole data 121 comprises an image file format (e.g., computer-aided design (CAD) file) that can be read by a manufacturing system 124 to create a three-dimensional object that corresponds to the personalized insole 103. In other examples, the personalized insole data 121 can be converted into an image file format that is readable by the manufacturing system 124. In some examples, the insole personalization application 212 can transmit the personalized insole data 121 to the manufacturing system 124 configured to create or otherwise manufactures a 3D object corresponding to the personalized insole 103 or one or more components of the personalized insole 103 based at least in part on the features of the personalized insole data 121.

The data stored in the data store 209 includes, for example, user data 215, personalized insole rules 218, and potentially other data. The user data 215 includes data associated with the individual who is receiving the personalized insoles 103. For example, the user data 215 can include the foot image data 115, user characteristics 136, shoe data 221, and/or other data associated with one or more foot scans of the individuals. The foot image data 115 includes data corresponding to various images of the bottom of an individual's foot and/or back of the individual's foot/leg that are captured via the optical image sensors 133 placed about (e.g., below, to the side, above, etc.) a scanner top plate 112 on which the individual is standing during the foot scan. In various examples, the foot image data 115 comprises different sets of data corresponding to different foot scans of a foot in different foot positions. For example, a first set of foot image data 115 can comprise foot image data of one or more foot scans of a foot in a resting position and a second set of foot image data 115 can comprise foot image data of one or more foot scans of the same foot in a toes-raised position 113. In various examples, the foot image data 115 can be further segmented into data for the left foot and/or the right foot of the individual.

The user data 215 can further include user characteristics 136 including, for example, a user name, a user height, a user weight, a user foot size, a user foot length, a user foot width, a role of the user in an organization, an estimated amount of time the user is on his or her feet during a given day, one or more individual defined conditions of the foot (e.g., foot pain, plantar fasciitis, Morton's toe, heel pain, neuroma, high arches, etc.), and/or other data. In various examples, the user characteristics 136 can be obtained via an onboarding process where the individual or other associate interacts with a client device 130 to define the user characteristics 136 associated with the individual.

The shoe data 221 corresponds to data for a given shoe and/or pair of shoes. In various example, an individual may have multiples shoes and want personalized insoles 103 for each pair of shoes. However, in accordance with various embodiments of the present disclosure, a personalized insole 103 is personalized for the individual and a specific shoe as each shoe may vary in dimensions and size thereby causing differences in sizes and shapes of a personalized insole 103. In various examples, the shoe data 221 comprises shoe properties 139, personalized insole data 121, and/or other data. The shoe properties 139 can comprise a shoe type, a shoe brand, a shoe size, an estimated wear time of the shoe by the individual, and/or other information. In various examples, the shoe properties 139 can be obtained via an onboarding process where the individual or other associate interacts with a client device 130 to define the shoe properties 139 associated with the shoe. In some examples, one or more of the shoe properties 139 can be obtained via a request to the shoe manufacturer and/or other third-party trusted entity.

In various examples, the personalized insole data 121 corresponds to a 3D representation of a personalized insole 103 based at least in part on the 3D foot representation(s) of the foot in one or more positions, the baseline, the adjustment parameters (e.g., areas of adjustment identified from comparison of 3D foot representations), the user characteristics 136, the shoe properties 139, and/or other data. The personalized insole data 121 defines the shape, size, and contours the personalized insole 103 that is determined according to an analysis of the 3D foot representations. In some examples, the personalized insole data 121 represents a negative of the bottom of the 3D foot representation of the foot in the resting position that is modified according to the identified attributes identified from one or more comparison(s) of the different sets of foot image data from different positions, the user characteristics 136, the shoe properties 139 and/or other data.

In some examples, the personalized insole data 121 comprises an image file format (e.g., computer-aided design (CAD) file) that can be read by a manufacturing system 124 create a three-dimensional object that corresponds to the personalized insole 103 or one or more components of the personalized insole 103. In other examples, the personalized insole data 121 can be converted into the image file format that is readable by the manufacturing system 124. The personalized insole data 121 can be transmitted to the manufacturing system 124 which in turn manufactures a 3D object corresponding to the personalized insole 103 or one or more components of the personalized insole 103 based at least in part on the features of the personalized insole data 121.

The personalized insole rules 218 include rules, models, and/or configuration data for the various algorithms or approaches employed by the insole personalization application 212. For example, the personalized insole rules 218 can include the various models and/or algorithms for generating 3D representations of the foot image data 115 corresponding to the different foot positions. In addition, the personalized insole rules 218 can include the various models and/or algorithms for identifying adjustment parameters in view of a comparison of the foot image data 115 corresponding to the different foot positions and modifying the 3D representation of the foot image data 115 of the foot in the resting position, the baseline, and/or the personalized insole data 121 based at least in part on the identified adjustment parameters. In various examples, the personalized insole rules 218 can include one or more trained models that can output the personalized insole data 121 for generating a personalized insole 103 by applying inputs and/or factors associated with the 3D representations of the foot, correction attributes, the user characteristics 136, the shoe prosperities 139, and/or other data.

The scanner system 106 comprises a scanner comprising a plurality of image sensors 133 disposed about a scanner top plate 112 and configured to obtain images of an individual's feet, individual's hindfoot for each foot, and/or original insoles 109 that are positioned on top of the scanner top plate 112. In various examples, the scanner system 106 comprises an optical scanner that uses optical image sensors 133 to scan perform the foot scans and obtain the corresponding foot image data 115. FIGS. 4A-4B and FIGS. 5A-5C illustrate examples of different embodiments of a scanner system 106 that can be used to obtain the foot image data 115. According to various embodiments, the scanner system 106 comprises control circuitry for controlling and interfacing with the image sensors 133 as well as for interfacing with the insole personalization application 212 of the computing environment 203 and the client application 227 of the client device 130.

The manufacturing system 124 is a system configured to manufacture a 3D object from a digital file. In various examples, the manufacturing system 124 is configured to apply one or more manufacturing techniques such as, for example, 3D printing, injection molding, casting, compression molding, and/or other techniques to manufacture a 3D object based at least in part on the personalized insole data 121. For example, in some embodiments, the manufacturing system 124 comprises a 3D printer configured to print a 3D version of the personalized insole 103 or one or more components of the personalized insole 103 in accordance to the personalized insole data 121.

In various examples, the personalized insole 103 can be manufactured by the manufacturing system 124 as a single component. In other examples, the personalized insole 103 comprises multiple components where one or more components can be manufactured by the manufacturing system 124 using one or more different manufacturing processes. In addition, in some examples, the manufacturing process is fully automated. In other examples, the manufacturing process can include one or more manual steps.

The client device 130 is representative of a plurality of client devices that may be coupled to the network 206. The client device 130 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 130 may include a display 230. The display 230 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 130 may be configured to execute various applications such as a client application 227 and/or other applications. The client application 227 may be executed in a client device 130 for example, to access network content served up by the computing environment 203, scanner system 106, manufacturing system 124, and/or other servers or components, thereby rendering a user interface 224 on the display 230. To this end, the client application 227 may comprise, for example, a browser, a dedicated application, etc., and the user interface 224 may comprise a network page, an application screen, etc. The client device 130 may be configured to execute applications beyond the client application 227 such as, for example, email applications, social networking applications, word processors, spreadsheets, and/or other applications.

Although the computing environment 203, the manufacturing system 124, the scanner system 106, and the client device 130 are illustrated as being separate from one another in the networked environment, it should be noted that one or more of these components can be integrated within one another. For example, the computing environment 203 can comprise the manufacturing system 124 and/or the scanner system 106. Likewise, the client device 130 can include and execute the insole personalization application 212 and receive the foot image data, onboarding data, and/or other data via communications with the scanner system 106 and/or other components, as can be appreciated.

Figure 3A:
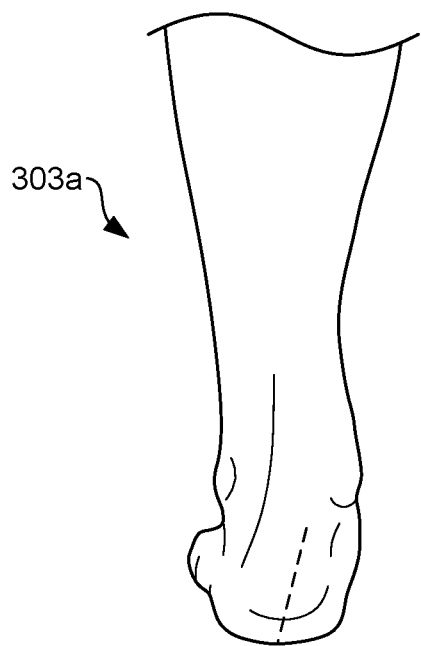
FIGS. 3A-3C are example drawings of the back of an individual's leg as the individual is standing in different standing positions.

Next, a general description of the operation of the various components of the networked environment 200 is provided with respect to FIGS. 3A-8. To begin, FIGS. 3A-3C illustrate example drawings of the back of an individual's leg as the individual is standing in different standing positions on a surface. FIG. 3A illustrates an example drawing of the back of an individual's leg 303$a$ in a resting or resting calcaneal stance position where the individual's toes are flat and engaged with a surface. FIG. 3B illustrates an example view of the back of the individual's leg 303$b$ in a second standing position (e.g., toes-raised position 113) where the individual's toes are lifted and raised away from the surface. The leg 303$b$ of FIG. 3B corresponds to view of a foot in a simulated NCSP. FIG. 3C illustrates an example drawing of the alignment differences between the leg 303$a$ of FIG. 3A and a leg 303$c$ in a NCSP position.

When individuals are standing and moving all day it is easy for their feet and body to become uncomfortable as the day goes on. By maintaining better foot positioning with a supportive insole, the individual can be more comfortable overall, which can improve their job satisfaction, reduce attrition, and reduce certain types of injuries. According to various embodiments of the present disclosure, the personalized insole 103 is designed based at least in part on identifying the contours and position of the foot while it is in an aligned load bearing position. "Load bearing" refers to an individual standing on his or her feet. Aligned refers to the foot being in a NCSP position which can be simulated by the toes-raised position 113 or a metatarsal doming position.

Figure 3B:
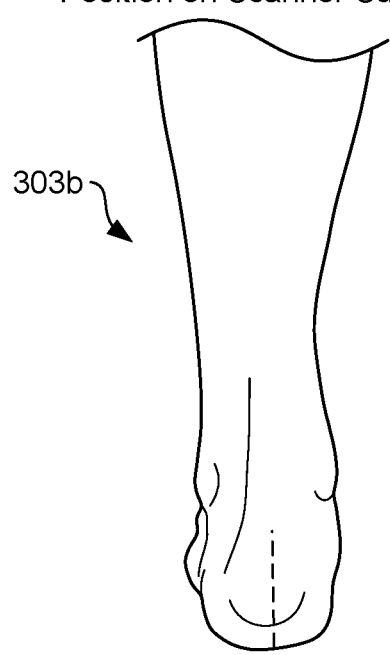
Figure 3C:
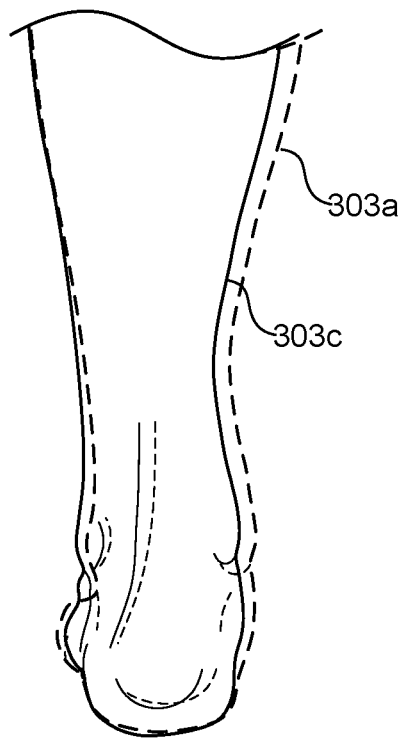

As illustrated in the FIG. 3C, the leg 303$c$ corresponds to a foot in a neutral calcaneal stance position (NCSP) that is manually adjusted to provide ideal hindfoot alignment, as compared to leg 303$a$ with the foot in the resting standing position as shown in 3A. In particular, as illustrated in FIG. 3B, raising one's toes to simulate a neutral calcaneal stance position causes the ankle to roll outward slightly, aligning the ankle joint over the heel. This reduced pronation of the foot can be useful in designing personalized insoles 103 that maintain the positioning of the foot closer to this aligned position for the individual.

Although FIGS. 3A, 3B, and 3C illustrate the alignment differences between a resting standing position (FIG. 3A) with a NCSP (FIG. 3C) and the toes-raised position 113 (FIG. 3B), it should be noted that metatarsal doming also simulates NCSP to provide ideal hindfoot realignment. Accordingly, features extracted from images of a foot in a metatarsal doming position and/or the toes-raised position 113 can be used to design personalized insoles 103 that maintain the position of the foot closer to the aligned position for the individual.

Figure 4A:
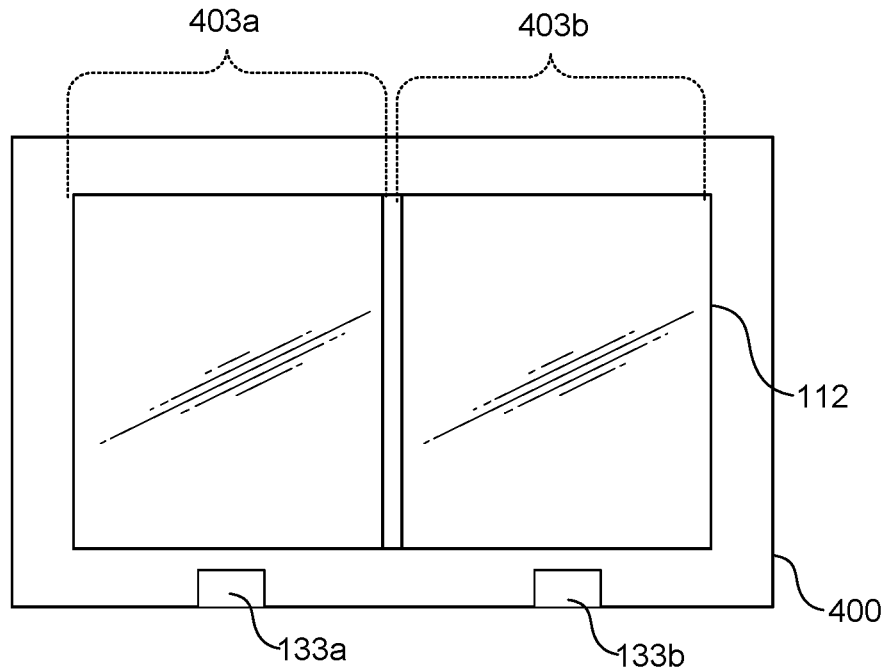
FIGS. 4A-4B illustrate drawings of an example of the scanner system of FIG. 2 according to various embodiments of the present disclosure.
Figure 4B:
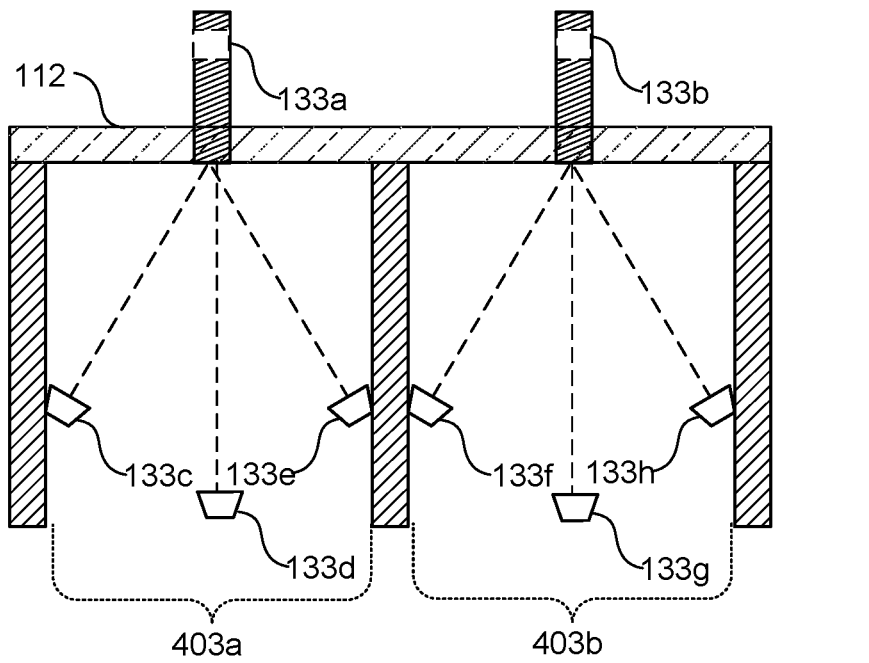

Turning now to FIGS. 4A-4B, shown is an example of a scanner system 106 according to various embodiments of the present disclosure. FIG. 4A illustrates a top view of a scanner system 106 and FIG. 4B illustrates a side cross section view of the scanner system 106. According to various embodiments, the scanner system 106 comprises a scanner top plate 112 secured in a scanner frame 400.

In various examples, the scanner top plate 112 comprises a transparent material (e.g., glass) that can support the weight of the individual associated with the foot scan and permits the image sensors 133 (e.g., 133a, 133b, 133c, 133d, 133e, 133f, 133g, 133h) to capture the contours and foot geometry of the foot positioned on the scanner top plate 112. In the example scanner system 106 of FIGS. 4A and 4B, the scanner top plate 112 comprises two scanning sections 403 (e.g., 403a, 403b). According to various examples, each scanning section 403 can be used for the placement of an individual's respective foot. For example, a user can be instructed to step on the scanner system 106 such that a first foot is positioned on the first scanning section 403a and a second foot is positioned on the second scanning section 403b.

As illustrated in FIG. 4B, each scanning section 303 can comprise a respective set or array of image sensors 133 that are positioned about the scanner top plate 112. In particular, image sensors 133c-h are arranged below the scanner top plate 112. However, image sensors 133a and 133b are positioned above the scanner top plate 112 and are positioned about the scanner top plate 112 to obtain one or more images of the back of the individual's foot/leg during a foot scan. In various examples, data from the image sensors 133a and 133b can be analyzed to determine the hindfoot alignment associated with the scanned foot. If the hindfoot alignment is not within a desired threshold, the individual can be notified and, in some examples, can be provided instructions or recommendations on how the individual can improve his or her hindfoot alignment for a given scan.

It should be noted that the arrangement of the images sensors 133 is not limited to the arrangements shown in FIGS. 4 and 5A-5C and can be arranged in any desired arrangement below and/or above the scanner top plate 112 as desired to obtain the foot image data 115 needed to generate the personalized insole data 121 in accordance to various embodiments for the present disclosure.

In various examples, each scanning section 303 can comprise one or more image sensors 133 that are positioned about the scanner top plate 112 and attached to various portions of the scanner frame 300 at varying angles such that each image sensor 133 captures an image of the scanning object (e.g., foot bottom, foot back, etc.) at various positions and angles. As illustrated in FIGS. 4A and 4B, the scanner system 106 can comprise sensors 133 (e.g., 133a and 133b) that are positioned above the scanner top plate 112 and configured to capture images of the back of the individual's leg to determine hindfoot alignment. Accordingly, an optical scan of the scanning object can be based at least in part on the image data captured from the image sensors 133 for a corresponding scanning section 303.

Figure 5A:
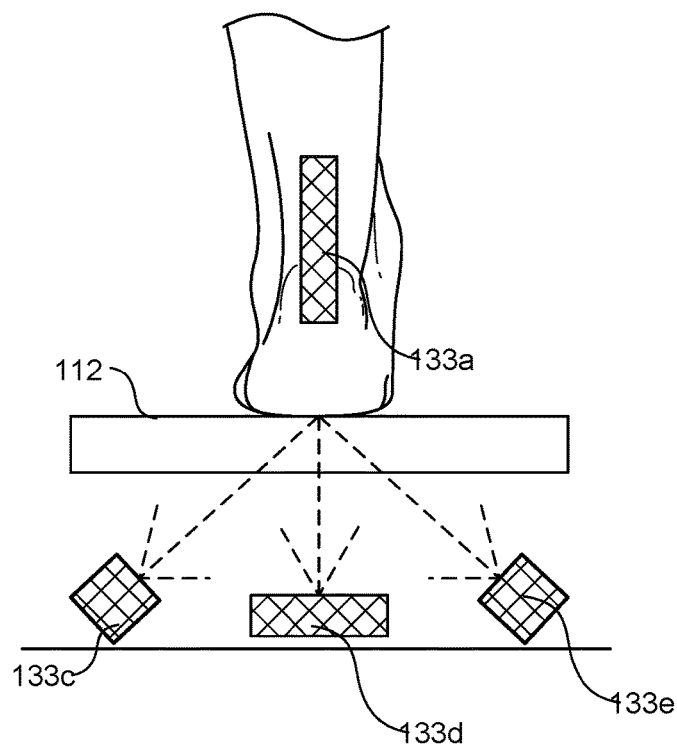
FIGS. 5A-5C illustrate drawings of example views of a foot positioned on a scanner top plate of the scanner system of FIG. 2 relative to an example arrangement of sensors of the scanner system of FIG. 2 according to various embodiments of the present disclosure.
Figure 5B:
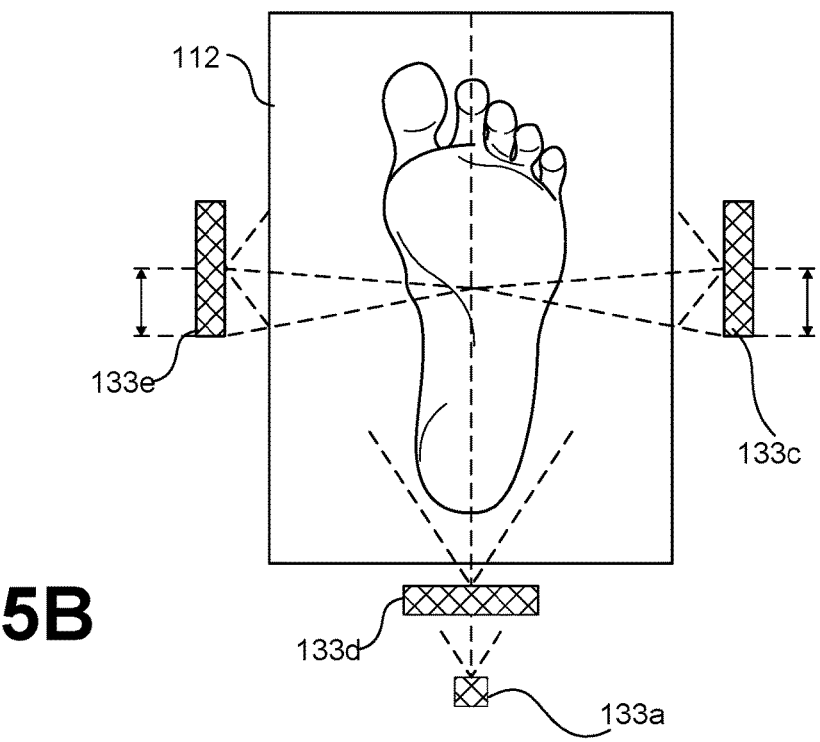
Figure 5C:
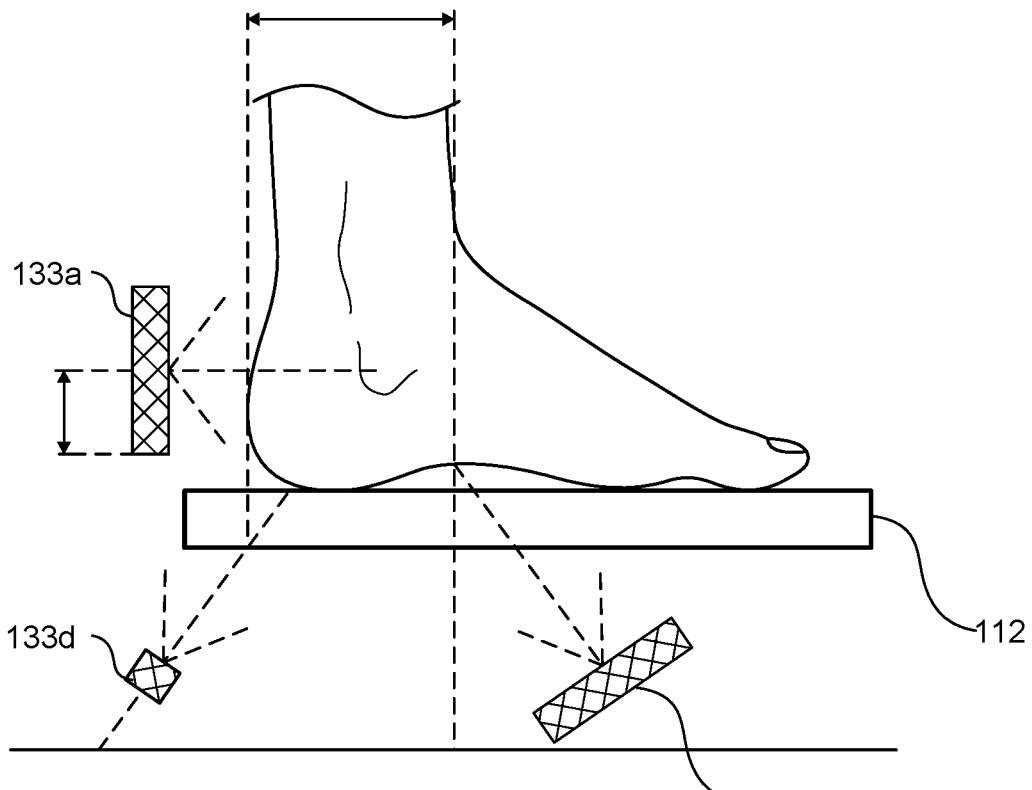

Turning now to FIGS. 5A-5C, shown are drawings of example views of a foot positioned on a scanner top plate 112 of the scanner system 106 relative to an example arrangement of sensors 133 of the scanner system 106 according to various embodiments of the present disclosure. For discussion purposes, assume that the portion of the scanner top plate 112 and corresponding sensors 133 (e.g., 133a and 133c-133e) correspond to the first scanning section 403a of the scanner system 106 of FIGS. 4A and 4B.

In particular, FIG. 5A illustrates a back view of a foot positioned on the scanner top plate 112. FIG. 5B illustrates a bottom view of the foot positioned on the scanner top plate 112. FIG. 5C illustrates a side view of the foot positioned on the scanner top plate 112. In FIGS. 5A-5C, the sensor 133a is positioned above the scanner top plate 112 such that the sensor 133a can obtain images corresponding to the back of the lower leg that illustrate hindfoot alignment. In some examples, the sensor 133a is mechanically coupled to the scanner system frame 400. In other examples, the sensor 133a is mechanically detached from the scanner system frame 400. In addition, the scanner system 106 can comprise sensors 133 (e.g., 133c-e) positioned below the scanner top plate 112 at varying angles to capture images of the bottom of the foot as positioned on the scanner top plate 112. In particular, image sensors 133c and 133e are positioned along the sides while image sensor 133d is positioned directly below the scanner top plate 112.

In various examples, data from the image sensors 133a can be analyzed to determine the hindfoot alignment associated with the scanned foot. If the hindfoot alignment is not within a desired threshold, the individual can be notified and, in some examples, can be provided instructions or recommendations on how the individual can improve his or her hindfoot alignment for a given scan.

Figure 6:
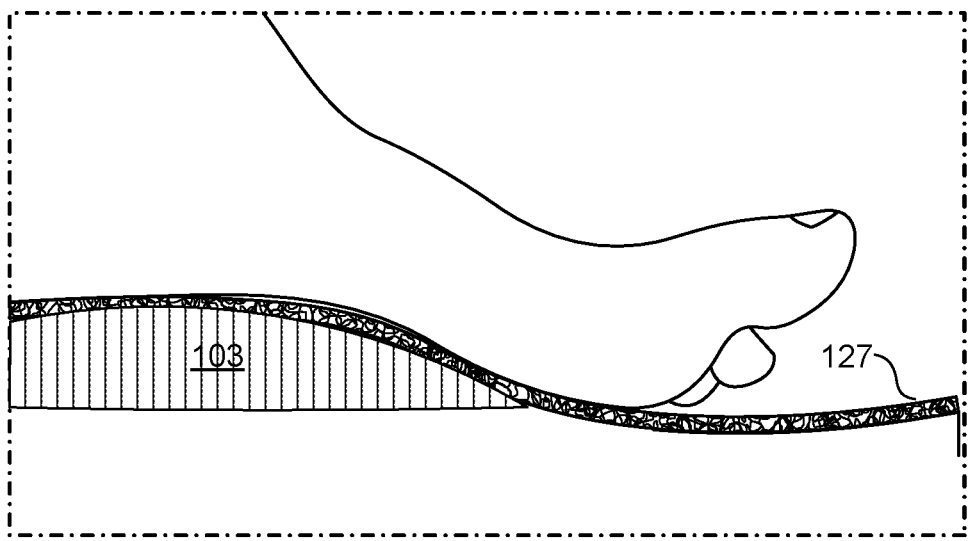
FIG. 6 illustrates a perspective drawing of an example personalized insole with an added foam layer positioned against the sole of an individual's foot, in accordance with various embodiments of the present disclosure.

Referring next to FIG. 6, shown is a perspective view of an example personalized insole 103 that is a ¾ length insole and comprises a foam layer 127 attached to a top portion of the personalized insole 103. As illustrated in FIG. 6, the personalized insole 103 and corresponding foam layer 127 engage with the sole of the individual's foot. The personalized insole 103 and corresponding foam layer 127 are sized and shaped to accurately fit within a specific shoe of the individual and are personalized for the individual to provide comfort and support in accordance with the contours and foot geometry of the individual's foot.

Figure 7B:
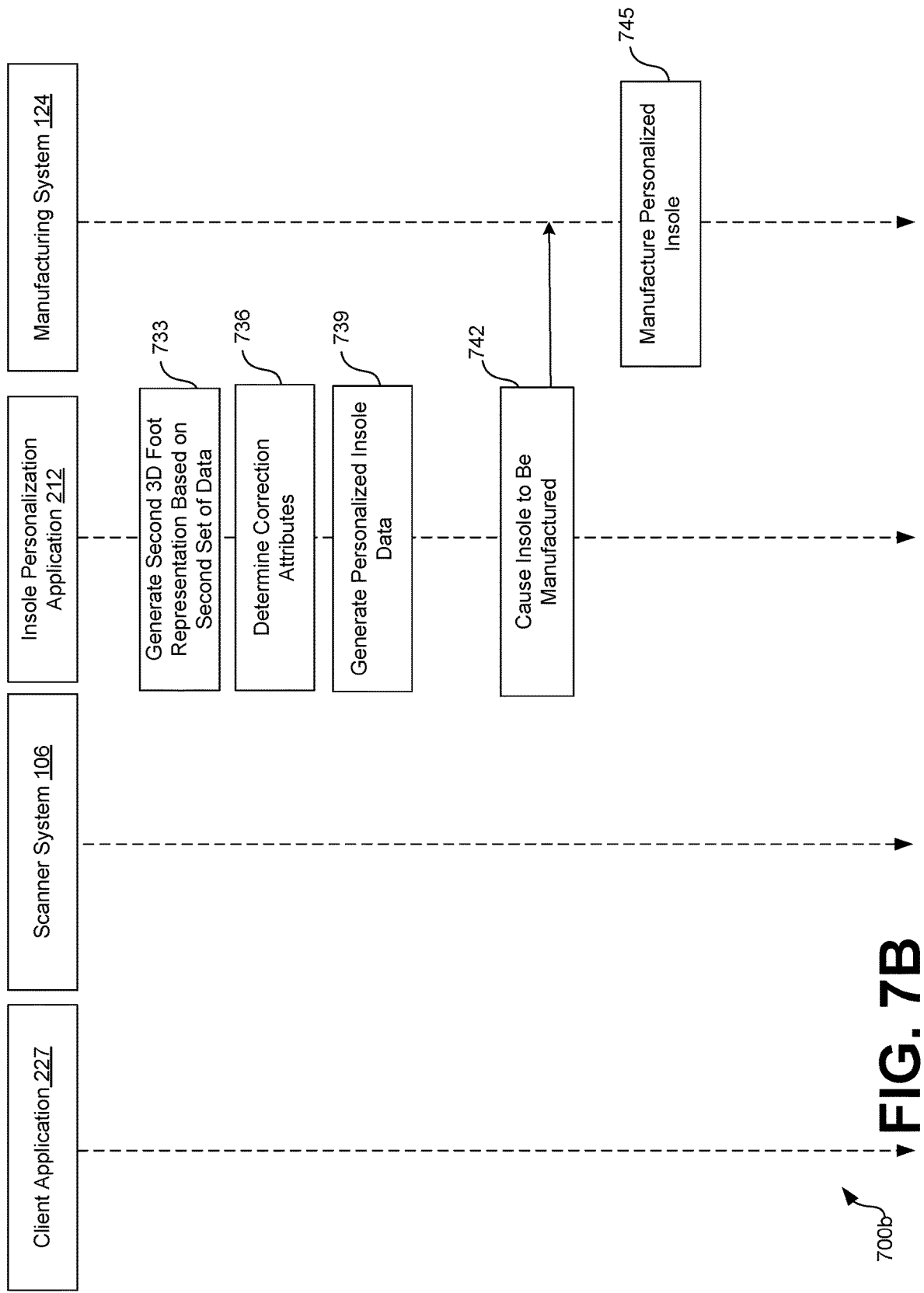

Moving on to FIGS. 7A-7B shown is a sequence diagram 700 (e.g., 700a, 700b) illustrating functionality implemented by components of the networked environment 200. It is understood that the sequence diagram of FIG. 7 provides merely an example of the many different types of functional arrangements that can be employed to implement the portions of the networked environment 200 as described herein. As an alternative, the sequence diagram of FIG. 7 can be viewed as depicting an example of elements of a method implemented within the networked environment 200 in some implementations. According to various examples, FIG. 7 relates to the functionality implemented by components of the networked environment 200 in generating personalized insoles 103 based at least in part on foot image data 115 obtained from foot scans at varying positions performed by the scanner system 106.

To begin, at box 703, the client application 227 obtains onboarding data associated with the individual receiving personalized insoles 103. In various examples, the onboarding data comprises user characteristics 136 associated with the individual getting personalized insoles 103, shoe properties 139 associated with the shoe associated with the personalized insole 103, and/or other data. The onboarding data can be obtained via an onboarding process where the individual or other associate interacts with the client application 227 of the client device 130 to define the user characteristics 136 associated with the individual, shoe properties 139 associated with the shoe associated with the personalized insole 103, and/or other data.

The user characteristics 136 can include, for example, a user name, a user height, a user weight, a user foot size, a user foot length, a user foot width, a role of the user in an organization, an estimated amount of time the user is on his or her feet during a given day, one or more individual defined conditions of the foot (e.g., foot pain, plantar fasciitis, Morton's toe, heel pain, neuroma, high arches, etc.), and/or other data. In various examples, the shoe properties 139 comprise a shoe type, a shoe brand, a shoe size, an estimated wear time of the shoe by the individual prior to scanning the original insole 109, and/or other information. In some examples, one or more of the shoe properties 139 can be obtained via a request to the shoe manufacturer and/or other third-party trusted entity. In various examples, the client application 227 can transmit the obtained onboarding data (e.g., shoe properties 139, user characteristics 136, etc.) to the insole personalization application 212 or to the computing environment 203 for storage in the data store 209.

At box 706, the client application 227 directs the individual to stand on the scanner system 106 in a first position For example, a user interface 224 can be generated and rendered on the display 230 of the client device 130. In various examples, the user interface 224 can visually or verbally indicate how the individual is to stand on the scanner system 106. For example, a user can be instructed to step on the scanner system 106 with bare feet such that a first foot is positioned on the first scanning section 303 of the scanner top plate 112 and a second foot is positioned on the second scanning section 303 of the scanning top plate. In various examples, the user can be further instructed to stand in a resting position, a toes-raised position 113, a metatarsal doming position, NCSP, and/or other type of position.

At box 709, the client application 227 directs the scanner system 106 to obtain the foot image data 115 associated with the objects (e.g., feet) positioned on the scanner top plate 112. For example, the client application 227 can be in data communication with the scanner system 106 over the network 206 and can send an instruction over the network 206 to the scanner system 106 instructing the scanner system 106 to conduct the foot scan. In some examples, a user interface 224 rendered on the display 230 of the client device 130 may include a selectable component that when selected generates and transmits an instruction to the scanner system 106 instructing the scanner system 106 to conduct the optical scan of the objects (e.g., feet).

At box 712, the scanner system 106 collects the foot image data 115 associated with the feet positioned on the scanner top plate 112 in the first position. In particular, the scanner system 106 can perform the foot scan by capturing images of the individual's feet via the image sensors 133 that are positioned at various angles about the scanner top plate 112 of the scanner system 106.

At box 715, the client application 227 directs the individual to stand on the scanner system 106 in a second position For example, a user interface 224 can be generated and rendered on the display 230 of the client device 130. In various examples, the user interface 224 can visually or verbally indicate how the individual is to stand on the scanner system 106. For example, a user can be instructed to step on the scanner system 106 with bare feet such that a first foot is positioned on the first scanning section 303 of the scanner top plate 112 and a second foot is positioned on the second scanning section 303 of the scanning top plate. In various examples, the user can be further instructed to stand in a resting position, a toes-raised position 113, a metatarsal doming position, NCSP, and/or other type of position. In various examples, the second position will differ from the first position. For example, the first position may correspond to a resting standing position and the second position may correspond to a toes-raised position 113.

At box 718, the client application 227 directs the scanner system 106 to obtain the foot image data 115 associated with the objects (e.g., feet) positioned on the scanner top plate 112. For example, the client application 227 can be in data communication with the scanner system 106 over the network 206 and can send an instruction over the network 206 to the scanner system 106 instructing the scanner system 106 to conduct the foot scan.

At box 721, the scanner system 106 collects the foot image data 115 associated with the feet positioned on the scanner top plate 112 in the second position. In particular, the scanner system 106 can perform the foot scan by capturing images of the individual's feet via the image sensors 133 that are positioned at various angles about the scanner top plate 112 of the scanner system 106.

At box 724, the scanner system 106 transmits the foot image data 115 to the client application 227. In particular, as the scanner system 106 conducts the foot scans and obtains the collected data from the corresponding image sensors 133, the scanner system 106 can transmit the collected data to the insole personalization application 212 over the network 206. Although not shown in FIG. 7A, in some examples, the scanner system 106 can transmit the foot image data 115 to the insole personalization application 212 instead of or in addition to the client application 227.

At box 727, the client application transmits the received foot image data 115 corresponding to the different foot scans and received by the scanner system 106 to the insole personalization application 212. In particular, as client application 227 obtains the collected data associated with the foot scans of the foot in different positions from the scanner system 106, the client application 227 can transmit the collected data to the insole personalization application 212 over the network 206.

At box 730, the insole personalization application 212 generates a 3D representation of the individual's foot based at least in part on the first set of foot image data 115 associated with the foot positioned in the first position. In particular, the insole personalization application 212 generates point cloud data corresponding to the 3D representation of the foot in the first position based at least in part on the data included in the images obtained from the image sensors positioned at varying angles about the scanner top plate 112. In various examples, the insole personalization application 212 can stich or otherwise combine the various data points included in the first set of foot image data 115 for the corresponding foot to form the 3D representation of the foot including the contours and foot geometry specific to the user's foot in the first position.

At box 733, the insole personalization application 212 generates a 3D representation of the individual's foot based at least in part on the second set of foot image data 115 associated with the foot positioned in the second position. In particular, the insole personalization application 212 generates point cloud data corresponding to the 3D representation of the foot in the second position based at least in part on the data included in the images obtained from the image sensors positioned at varying angles underneath the scanner top plate 112. In various examples, the insole personalization application 212 can stich or otherwise combine the various data points included in the second set of foot image data 115 for the corresponding foot to form the 3D representation of the foot including the contours and foot geometry specific to the user's foot in the second position.

At box 736, the insole personalization application 212 determines correction attributes (adjustment parameters) based at least in part on an analysis of the representations of the foot in different positions. For example, the 3D foot representations corresponding to different foot positions can be compared to calculate or otherwise determine adjustment parameters associated with the contours and overall foot geometry of the individual's foot. For example, a 3D foot representation of a foot in a resting position can be compared with a 3D foot representation of a foot in a toes-raised position 113 to identify areas of the 3D foot representation of the foot in the resting position that may need to be modified to ensure support of the foot in aligned load bearing positions.

In some examples, the insole personalization application 212 determines a baseline associated with the user's foot according to a 3D foot representation of the foot in the first position (e.g., resting position) that is generated using the first set of foot image data 115. The resting foot position corresponds to a position where the heel and toes of the foot are relaxed and engaged with the top surface of the scanner top plate 112. In various examples, the baseline corresponds to a negative of the bottom of the foot in the resting position using the 3D representation of the foot in the resting position. In various examples, the insole personalization application 212 can compare the baseline associated with the user's foot with a 3D foot representation of the foot in the second position (e.g., a toes-raised position 113, a metatarsal doming position, NCSP, etc.) to identify areas of the baseline (e.g., arch height, toe location, metatarsal head location, etc.) that require adjustment of the baseline to conform with the foot in an aligned load bearing position. It should be noted that both the toes-raised position 113, the metatarsal doming position and NCSP cause the ankle to roll outward slightly, thereby aligning the ankle joint over the heel to mimic the body's natural aligned load-bearing position. In various examples, the identified areas or adjustment parameters can be used to modify the baseline or the 3D representation of the user's foot in the resting position.

At box 739, the insole personalization application 212 generates the personalized insole data 121 according to different sets of the foot image data 115, the 3D representations of the foot in different positions, the determined attributes, and/or other data. In some examples, the personalized insole data 121 represents a negative of the bottom of the 3D foot representation of the foot in the resting position (e.g., first position) that is modified according to the identified attributes from the comparison of foot features in different positions, the user characteristics 136, the shoe properties 139 and/or other data. In some examples, the insole personalization application 212 inputs features associated with the 3D foot representations, the identified attributes, the user characteristics 136, the shoe properties 139, and/or other data into a machine learning model that is trained to output the personalized insole data 121 based at least in in part on the various inputs.

In various examples, the personalized insole data 121 comprises an image file format (e.g., computer-aided design (CAD) file) that can be read by a manufacturing system 124 (e.g., a 3D printer) to create a three-dimensional object that corresponds to the personalized insole 103 or one or more components of the personalized insole 103. In other examples, the personalized insole data 121 can be converted into an image file format that is readable by the manufacturing system 124.

At step 742, the insole personalization application 212 transmits the personalized insole data 121 to a manufacturing system 124 configured to manufacture a 3D object corresponding to the personalized insole 103 or one or more components of the personalized insole 103 based at least in part on the features of the personalized insole data 121. For example, the insole personalization application 212 can transmit, over the network 206, the personalized insole data 121 in the appropriate image file format to the manufacturing system 124.

At step 745, the manufacturing system 124 manufactures a 3D object corresponding to the personalized insole 103 or one or more components of the personalized insole 103 based at least in part on the features of the personalized insole data 121. In various examples, the manufacturing system 124 is configured to apply one or more manufacturing techniques such as, for example, 3D printing, injection molding, casting, compression molding, and/or other techniques to manufacture a 3D object based at least in part on the personalized insole data 121. For example, in some embodiments, the manufacturing system 124 comprises a 3D printer configured to print a 3D version of the personalized insole 103 or one or more components of the personalized insole 103 in accordance to the personalized insole data 121.

In various examples, the personalized insole 103 can be manufactured by the manufacturing system 124 as a single component. In other examples, the personalized insole 103 comprises multiple components where one or more components can be manufactured by the manufacturing system 124 using one or more different manufacturing processes. In addition, in some examples, the manufacturing process is fully automated. In other examples, the manufacturing process can include one or more manual steps. In some examples, once the personalized insole 103 is manufactured, a foam layer 127 extending from a heel to the longest toe can be attached to a top portion of the personalized insole 103. Accordingly, the personalized insole 103 can be inserted into the user's shoe. Thereafter, this portion of the process proceeds to completion.

Figure 8:
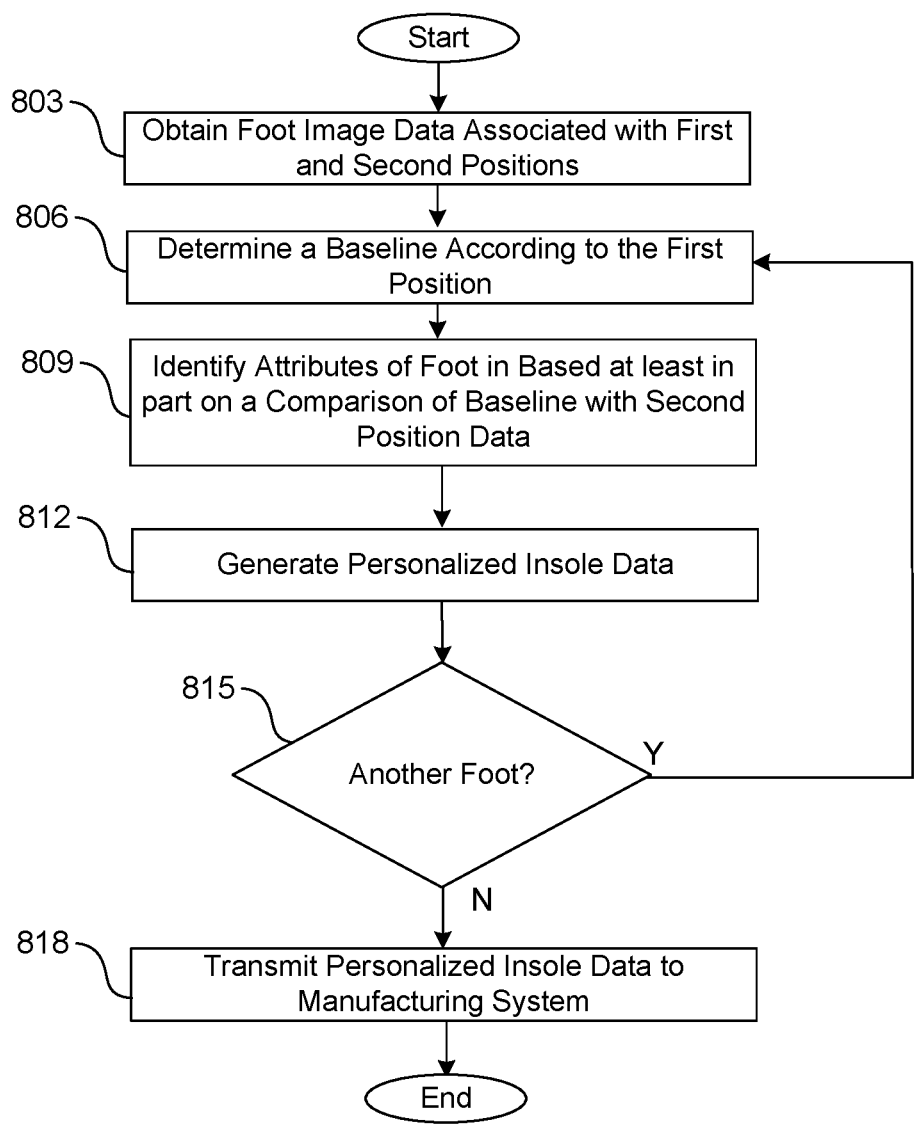
FIG. 8 is a flowchart illustrating one example of functionality implemented as portions of an insole personalization application executed in a computing environment in the networked environment of FIG. 2 according to various embodiments of the present disclosure.

Referring next to FIG. 8, shown is a flowchart that provides one example of the operation of a portion of the insole personalization application 212 according to various embodiments. It is understood that the flowchart of FIG. 8 provides merely an example of the many different types of functional arrangements that may be employed to implement the operation of the portion of the insole personalization application 212 as described herein. As an alternative, the flowchart of FIG. 8 may be viewed as depicting an example of elements of a method implemented in the computing environment 203 (FIG. 2) according to one or more embodiments.

Beginning with box 803, the insole personalization application 212 obtains the foot image data 115 associated with the foot scans of an individual's feet in a first position (e.g., resting position) and a second position (e.g., toes-raised position 113, metatarsal doming, NCSP, etc.). The foot image data 115 can be obtained from the scanner system 106, the client application 227, and/or other application or system. The foot image data 115 includes data corresponding to various images of the bottom of an individual's foot and/or back of the individual's foot/leg that are captured via the optical image sensors 133 placed about (e.g., below, to the side, above, etc.) a scanner top plate 112 on which the individual is standing during the foot scan. In various examples, the foot image data 115 comprises different sets of data corresponding to different foot scans of a foot in different foot positions. For example, a first set of foot image data 115 can comprise foot image data of one or more foot scans of a foot in a resting position and a second set of foot image data 115 can comprise foot image data of one or more foot scans of the same foot in a toes-raised position 113, a metatarsal doming position, a NCSP, or another type of simulated NCSP. In various examples, the foot image data 115 can be further segmented into data for the left foot and/or the right foot of the individual.

At box 806, the insole personalization application 212 determines a baseline according to the first set of foot image data 115 associated with a foot in a first position (e.g., resting position). The resting foot position corresponds to a position where the heel and toes of the foot are relaxed and engaged with the top surface of the scanner top plate 112. In various examples, the insole personalization application 212 generates a 3D representation of the individual's foot based at least in part on the first set of foot image data 115 associated with the foot positioned in the first position. In particular, the insole personalization application 212 generates point cloud data corresponding to the 3D representation of the foot in the first position based at least in part on the data included in the images obtained from the image sensors positioned at varying angles underneath the scanner top plate 112. In various examples, the insole personalization application 212 can stich or otherwise combine the various data points included in the first set of foot image data 115 for the corresponding foot to form the 3D representation of the foot including the contours and foot geometry specific to the user's foot in the first position. In various examples, the baseline corresponds to the 3D foot representation of the foot in the resting position or a negative of the bottom of the foot that is determined from the 3D foot representation of the foot in the resting position At step 809, the insole personalization application 212 can compare the baseline associated with the user's foot with a 3D foot representation of the foot in a toes-raised position 113, a metatarsal doming position, a NSCP, or other simulated NSCP to identify areas (e.g., attributes) of the baseline that require adjustment of the baseline to conform with the foot in an aligned load bearing position. It should be noted that the toes-raised position 113, the metatarsal doming position, the NSCP, or other simulated NSCP cause the ankle to roll outward slightly, thereby aligning the ankle joint over the heel to mimic the body's aligned load-bearing position.

For example, the 3D foot representations corresponding to different foot positions can be compared to calculate or otherwise determine adjustment parameters associated with the contours and overall foot geometry of the individual's foot. For example, a 3D foot representation of a foot in a resting position or the generated baseline can be compared with a 3D foot representation of a foot in a toes-raised position 113 to identify areas of the 3D foot representation of the foot in the resting position that may need to be modified to ensure support of the foot in aligned load bearing positions. In various examples, the identified areas or adjustment parameters can be used to modify the baseline or the 3D representation of the user's foot in the resting position.

At box 812, the insole personalization application 212 generates the personalized insole data 121 based at least in part on baseline, foot image data 115, identified attributes, and/or other data. In some examples, the personalized insole data 121 represents a negative of the bottom of the 3D foot representation of the foot in the first position (e.g., resting position) that is modified according to the identified attribute from the 3D foot representation of the foot in the second position, the user characteristics 136, the shoe properties 139 and/or other data. In some examples, the insole personalization application 212 inputs features associated with the 3D foot representations, the identified attributes, the user characteristics 136, the shoe properties 139, and/or other data into a machine learning model that is trained to output the personalized insole data 121 based at least in in part on the various inputs. In various examples, the personalized insole data 121 comprises an image file format (e.g., computer-aided design (CAD) file) that can be read by a manufacturing system 124 to create a three-dimensional object that corresponds to the personalized insole 103 or components of the personalized insole 103. In other examples, the personalized insole data 121 can be converted into an image file format that is readable by the manufacturing system 124.

At box 815, the insole personalization application 212 determines if there is another foot that requires a personalized insole 103. For example, if the personalized insole data 121 generated at box 812 corresponds to the individual's left foot and personalized insole data 121 still needs to be generated for the individuals' right foot, the insole personalization application 212 will determine that there is another foot and will return to box 806. Otherwise, the insole personalization application 212 will proceed to box 818.

At box 818, the insole personalization application 212 transmits the personalized insole data 121 to a manufacturing system 124 configured manufacture a 3D object corresponding to the personalized insole 103 or one or more components of the personalized insole 103 based at least in part on the features of the personalized insole data 121. For example, the insole personalization application 212 can transmit, over the network 206, the personalized insole data 121 in the appropriate image file format to the manufacturing system 124. Thereafter, this portion of the process proceeds to completion.

Figure 9:
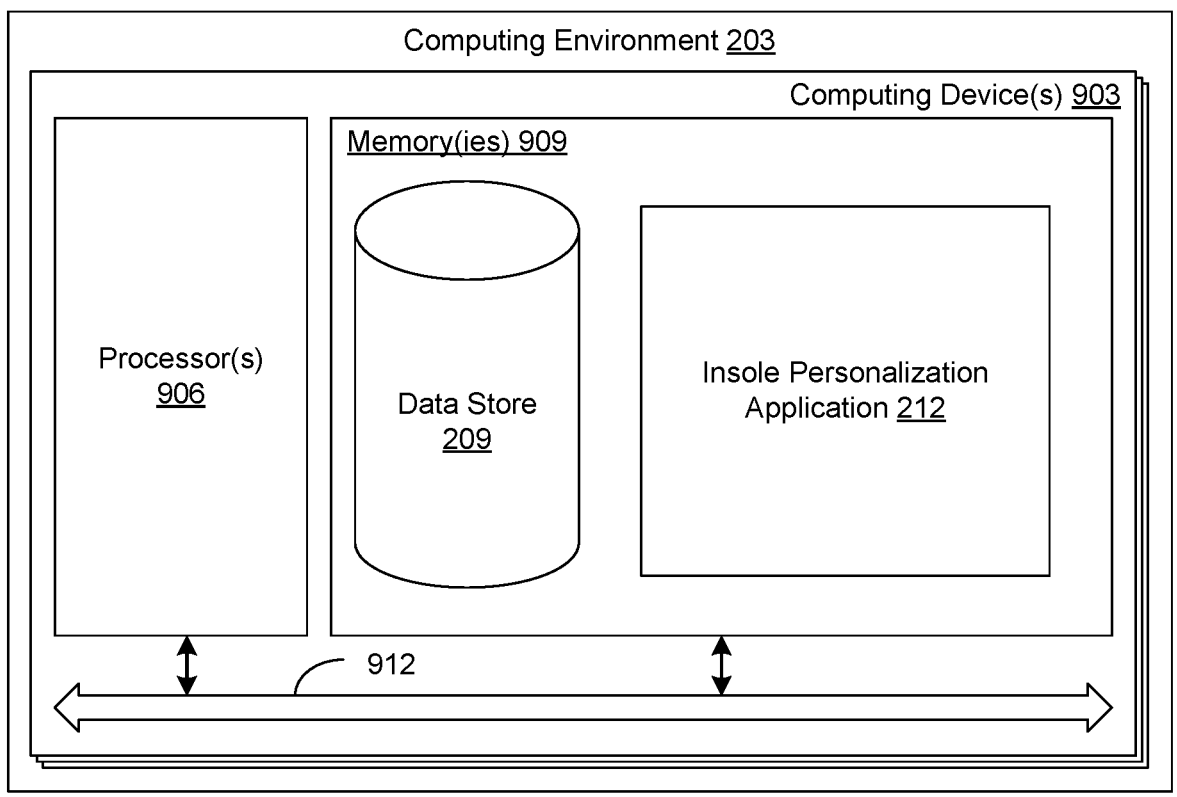
FIG. 9 is a schematic block diagram that provides one example illustration of a computing environment employed in the networked environment of FIG. 2 according to various embodiments of the present disclosure.

With reference to FIG. 9, shown is a schematic block diagram of the computing environment 203 according to an embodiment of the present disclosure. The computing environment 203 includes one or more computing devices 903. Each computing device 903 includes at least one processor circuit, for example, having a processor 906 and a memory 909, both of which are coupled to a local interface 912. To this end, each computing device 903 may comprise, for example, at least one server computer or like device. The local interface 912 may comprise, for example, a data bus with an accompanying address/control bus or other bus structure as can be appreciated.

Stored in the memory 909 are both data and several components that are executable by the processor 906. In particular, stored in the memory 909 and executable by the processor 906 are insole personalization application 212, and potentially other applications. Also stored in the memory 909 may be a data store 209 and other data. In addition, an operating system may be stored in the memory 909 and executable by the processor 906.

It is understood that there may be other applications that are stored in the memory 909 and are executable by the processor 906 as can be appreciated. Where any component discussed herein is implemented in the form of software, any one of a number of programming languages may be employed such as, for example, C, C++, C#, Objective C, Java®, JavaScript®, Perl, PHP, Visual Basic® Python®, Ruby, Flash®, or other programming languages.

A number of software components are stored in the memory 909 and are executable by the processor 906. In this respect, the term "executable" means a program file that is in a form that can ultimately be run by the processor 906. Examples of executable programs may be, for example, a compiled program that can be translated into machine code in a format that can be loaded into a random access portion of the memory 909 and run by the processor 906, source code that may be expressed in proper format such as object code that is capable of being loaded into a random access portion of the memory 909 and executed by the processor 906, or source code that may be interpreted by another executable program to generate instructions in a random access portion of the memory 909 to be executed by the processor 906, etc. An executable program may be stored in any portion or component of the memory 909 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 909 is defined herein as including both volatile and nonvolatile memory and data storage components. Volatile components are those that do not retain data values upon loss of power. Nonvolatile components are those that retain data upon a loss of power. Thus, the memory 909 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 906 may represent multiple processors 906 and/or multiple processor cores and the memory 909 may represent multiple memories 909 that operate in parallel processing circuits, respectively. In such a case, the local interface 912 may be an appropriate network that facilitates communication between any two of the multiple processors 906, between any processor 906 and any of the memories 909, or between any two of the memories 909, etc. The local interface 912 may comprise additional systems designed to coordinate this communication, including, for example, performing load balancing. The processor 906 may be of electrical or of some other available construction.

Although the insole personalization application 212, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram of FIGS. 7A-7B and the flowchart of FIG. 8 the functionality and operation of an implementation of portions of components in the networked environment 200. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 906 in a computer system or other system. The machine code may be converted from the source code, etc. If embodied in hardware, each block may represent a circuit or a number of interconnected circuits to implement the specified logical function(s).

Although the sequence diagram of FIGS. 7A-7B and the flowchart of FIG. 8 show a specific order of execution, it is understood that the order of execution may differ from that which is depicted. For example, the order of execution of two or more blocks may be scrambled relative to the order shown. Also, two or more blocks shown in succession in FIGS. 7A-7B and FIG. 8 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including insole personalization application 212, that comprises software or code can be embodied in any non-transitory computer-readable medium for use by or in connection with an instruction execution system such as, for example, a processor 906 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including insole personalization application 212, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 903, or in multiple computing devices 903 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system comprising:
a scanning device comprising a plurality of sensors positioned around a transparent plate; and
at least one computing device in communication with the scanning device wherein:
least one computing device includes an application that, when executed, causes the at least one computing device to at least:
collect a first set of foot image data from the scanning device, the first set of foot image data being associated with a first foot scan of a foot of a user, the foot being in a first position with toes of the foot engaged with the transparent plate;
collect a second set of foot image data from the scanning device, the second set of foot image data being associated with a second foot scan of the foot in a second position comprising one of a toes-raised position or a metatarsal doming position;
generate a first three-dimensional (3D) foot representation of the foot in the first position based at least in part on the first set of foot image data;
generate a second 3D foot representation of the foot of the user in the second position based at least in part on the second set of foot image data;
determine a baseline corresponding to a negative of a bottom of the foot based at least in part on the first 3D foot representation;
generate a comparison between the baseline and the second 3D foot representation, wherein the comparison indicates an adjustment of the baseline to an aligned load bearing position;
generate a modified version of the first 3D foot representation based at least in part on the adjustment of the baseline to the aligned load bearing position;
generate personalized insole data for creating a personalized insole component for a shoe of the user based at least in part on the modified version of the first 3D foot representation, wherein the personalized insole data corresponds to an output of a trained machine learning model; and
transmit the personalized insole data to a manufacturing system for manufacturing the personalized insole component.

2. The system of claim 1, wherein, when executed, the application further causes the at least one computing device to obtain onboarding data associated with the user and the shoe, and generating the personalized insole data is based at least in part on the onboarding data and the modified version of the first 3D foot representation.

3. The system of claim 1, wherein;
respective portions of the first set of foot image data and the second set of foot image data comprises one or more images of a back portion of the foot including an ankle and a heel of the foot, and
when executed, the application further causes the at least one computing device to at least determine a hindsight alignment of the foot based at least in part on an analysis of the one or more images.

4. The system of claim 1, wherein the personalized insole data comprises an image file format that is readable by the manufacturing system.

5. A method comprising:
obtaining, via at least one computing device, a first set of foot image data from a scanner system, wherein the first set of foot image data is associated with a first foot scan of a foot in a first orientation;
obtaining, via the at least one computing device, a second set of foot image data from the scanner system, wherein the second set of foot image data is associated with a second foot scan of the foot in a second orientation that is different from the first orientation;
determining, via the at least one computing device, a baseline corresponding to a negative of a bottom of the foot based at least in part on the first set of foot image data;
generating a comparison of the baseline and the second set of foot image data, wherein the comparison indicates one or more corrections of the baseline to an aligned load bearing orientation;
generating, via the at least one computing device, a modified version of the first set of foot image data based at least in part on the one or more corrections; and
generating, via the at least one computing device, personalized insole data based at least in part on, the modified version of the first set of foot image data, wherein the personalized insole data comprises an output of a trained machine learning model and corresponds to a three-dimensional (3D) representation of a personalized insole component to be inserted into a shoe of an individual associated with the foot.

6. The method of claim 5, wherein the first orientation corresponds to a resting calcaneal stance position or a simulated resting calcaneal stance position and the second orientation comprises a neutral calcaneal stance position, a toes-raised position, or a metatarsal doming position.

7. The method of claim 5, further comprising generating a first 3D foot representation of the foot in the first orientation based at least in part on the first set of foot image data.

8. The method of claim 5, further comprising modifying a 3D foot representation of the foot based at least in part on the one or more corrections.

9. The method of claim 5, further comprising obtaining onboarding data associated with the individual and the shoe, wherein the onboarding data comprises at least one of a role of the individual in an organization; a shoe size; or one or more individual defined conditions of the foot, a shoe type, or a shoe brand or wherein the onboarding data comprises at least one of a role of the individual in an organization; a shoe size; one or more individual defined conditions of the foot; a shoe type; or a shoe brand.

10. The method of claim 9, wherein the personalized insole data is generated based at least in part on the onboarding data and the modified version of the first set of foot image data.

11. The method of claim 5, transmitting the personalized insole data to a manufacturing system configured to manufacturing the personalized insole component based at least in part on the personalized insole data.

12. A computing device comprising:
at least one processor; and
at least one memory in communication with the at least one processor, wherein the memory stores an application that, when executed by the at least one processor, causes the computing device to at least:
obtain foot image data associated with a foot scan of a foot positioned on a scanning plate of a scanner system with toes of the foot lifted away from a top surface of the scanning plate;
compare the foot image data with a baseline corresponding to a negative of a bottom of the foot;
generate a comparison of the baseline with the foot image data, wherein the comparison indicates at least one correction of the baseline to an aligned load bearing position;
generate a modified version of the foot image data based at least in part on the at least one correction;
generate a three-dimensional (3D) foot representation of the foot of a user based at least in part on the modified version of the foot image data; and
generate personalized insole data for at least one personalized insole component of a personalized insole based at least in part on the 3D foot representation and the at least one correction, wherein the personalized insole data corresponds to an output of a trained machine learning model.

13. The computing device of claim 12, wherein;
the foot image data comprises a first set of foot image data associated with a first scan of the foot being in a first position, and
the application when executed by the at least one processor, further causes the computing device to at least:
obtain a second set of foot image data associated with a second foot scan of the foot in a second position, and
generate the personalized insole data is based at least in part on the second set of foot image data, the 3D foot representation, and the at least one correction.

14. The computing device of claim 12, wherein;
at least a portion of the foot image data comprises one or more images of a back portion of the foot including an ankle and a heel of the foot, and
the application, when executed by the at least one processor, further causes the computing device to at least determine an alignment of the ankle of the foot relative to the heel of the foot based at least in part on an analysis of the one or more images in the foot image data.

15. The computing device of claim 12, wherein the foot image data is obtained from the scanner system or another computing device in communication with the scanner system.

16. The computing device of claim 12, wherein the scanner system comprises an optical scanning device comprising a plurality of optical sensors.

17. The computing device of claim 12, wherein the application, when executed by the at least one processor, further causes the computing device to at least:
obtain onboarding data from a client device, wherein the onboarding data defines one or more properties of at least one of the user or a shoe for inserting the personalized insole; and
generate the 3D foot representation based at least in part on the onboarding data and the modified version of the foot image data.

18. The computing device of claim 12, wherein the application, when executed by the at least one processor, further causes the computing device to at least transmit the personalized insole data to a manufacturing system configured to manufacture at least one component of the personalized insole based at least in part on the personalized insole data.

19. The computing device of claim 18, wherein the personalized insole data comprises an image file format that is readable by the manufacturing system.

20. The computing device of claim 12, wherein:
the foot image data comprises a plurality of images captured from a plurality of optical sensors of the scanner system, and
to generate the 3D foot representation, the application, when executed by the at least one processor, causes the computing device to generate point cloud data based at least in part on the foot image data.

* * * * *

UNITED STATES PATENT AND TRADEMARK OFFICE
CERTIFICATE OF CORRECTION

PATENT NO. : 12,274,329 B1  
APPLICATION NO. : 17/951368  
DATED : April 15, 2025  
INVENTOR(S) : Jinsup Song et al.

Page 1 of 1

It is certified that error appears in the above-identified patent and that said Letters Patent is hereby corrected as shown below:

In the Claims

Column 21, Claim 1, Line 33, delete "least one" and insert -- the at least one --.

Column 22, Claim 3, Line 10, delete "1, wherein;" and insert -- 1, wherein: --.

Column 23, Claim 13, Line 41, delete "12, wherein;" and insert -- 12, wherein: --.

Column 24, Claim 14, Line 4, delete "12, wherein;" and insert -- 12, wherein: --.

Signed and Sealed this  
Eighth Day of July, 2025

Coke Morgan Stewart  
*Acting Director of the United States Patent and Trademark Office*